United States Patent
Ye

(10) Patent No.: US 8,213,193 B2
(45) Date of Patent: Jul. 3, 2012

(54) FLYBACK DC-DC CONVERTER WITH FEEDBACK CONTROL

(75) Inventor: Zhibin Ye, Singapore (SG)

(73) Assignee: O2Micro Inc, Santa Clara, CA (US)

( * ) Notice: Subject to any disclaimer, the term of this patent is extended or adjusted under 35 U.S.C. 154(b) by 338 days.

(21) Appl. No.: 11/998,351

(22) Filed: Nov. 28, 2007

(65) Prior Publication Data

US 2008/0130325 A1    Jun. 5, 2008

Related U.S. Application Data

(60) Provisional application No. 60/872,179, filed on Dec. 1, 2006.

(51) Int. Cl.
*H02M 3/335* (2006.01)
(52) U.S. Cl. ............... 363/21.14; 363/21.16; 363/21.18
(58) Field of Classification Search ............... 323/299; 363/21.12, 21.14, 21.16, 21.18, 21.06, 21.08
See application file for complete search history.

(56) References Cited

U.S. PATENT DOCUMENTS

| | | | |
|---|---|---|---|
| 5,751,565 A * | 5/1998 | Faulk ............................. | 363/41 |
| 6,430,063 B1 * | 8/2002 | Nishimura et al. ........ | 363/21.06 |
| 6,529,390 B2 * | 3/2003 | Takahashi ................. | 363/21.14 |
| 6,597,221 B2 * | 7/2003 | Hall et al. ................... | 327/175 |
| 6,836,415 B1 * | 12/2004 | Yang et al. ................ | 363/21.01 |
| 7,170,763 B2 * | 1/2007 | Pai et al. .................... | 363/21.16 |
| 7,233,505 B2 * | 6/2007 | Chen et al. ................. | 363/21.16 |
| 7,372,710 B2 * | 5/2008 | Kyono ........................ | 363/21.14 |
| 7,505,287 B1 * | 3/2009 | Kesterson .................. | 363/21.01 |
| 7,558,093 B1 * | 7/2009 | Zheng .......................... | 363/97 |
| 2004/0100241 A1 | 5/2004 | Abo | |
| 2005/0078493 A1 * | 4/2005 | Kim et al. .................. | 363/21.16 |
| 2006/0002155 A1 * | 1/2006 | Shteynberg et al. ....... | 363/21.12 |
| 2007/0080671 A1 * | 4/2007 | Qahouq et al. ............. | 323/282 |
| 2008/0123372 A1 * | 5/2008 | Yang ........................... | 363/21.16 |

FOREIGN PATENT DOCUMENTS

CN    1460316 A    12/2003

* cited by examiner

*Primary Examiner* — Adolf Berhane
*Assistant Examiner* — Fred E Finch, III

(57) ABSTRACT

A flyback DC-DC converter is disclosed herein. The flyback DC-DC converter includes a controller, an input switching circuit, a transformer and an output switching circuit. The input switching circuit is controlled by the controller and thus controls power supply to the transformer. The transformer is equipped with a first secondary winding to provide the output voltage, a second secondary winding that forms a feedback loop together with a voltage divider, and a third secondary winding to control the output switching circuit.

24 Claims, 3 Drawing Sheets

FLYBACK DC-DC CONVERTER WITH FEEDBACK CONTROL

RELATED APPLICATION

This application claims priority to U.S. provisional application, titled Flyback DC-DC Converter, Ser. No. 60/872,179, filed on Dec. 1, 2006, the specification of which is incorporated herein in its entirety by this reference.

BACKGROUND OF THE INVENTION

1. Field of the Invention

The present invention relates to power converters and more particularly to flyback DC-DC converters.

2. Description of the Related Art

Converters are frequently used to convert an unregulated voltage from a power source to a regulated voltage in electronic systems. Converters are especially prevalent in environments that include telecommunications or computer equipment, such as in power over Ethernet (PoE), potable electronic devices, etc. A converter can receive an input voltage and convert it to an output voltage or to a plurality of voltages at desired values according to users' requirements.

A conventional converter usually includes a transformer. The transformer typically includes a primary winding and a secondary winding. The primary winding is connected to a power source, preferably a DC voltage source to receive an input voltage that is unregulated. The transformer converts the input voltage at the primary winding to an output voltage at the secondary winding. The value of the output voltage is proportional to that of the input voltage, usually equaling the input voltage multiplied by winding ratio of the secondary winding to the primary winding. The energy from the power source can be stored in flux of the transformer core or be supplied to a load via the secondary winding. Hence, power transfer through the transformer is achieved.

According to one conventional approach, adjusting and controlling the output voltage value of the converter to satisfy different requirements may be desired. Accordingly, flyback converter topologies have been developed. A conventional flyback converter comprises a transformer with a primary winding and a secondary winding. Furthermore, an input circuit including a switching circuit is connected to the primary winding of the transformer while an output circuit is connected to the secondary winding of the transformer. A control block controls states of the switching circuit to control the cyclic switching on and off of the input circuit. A feedback loop couples the output circuit of the transformer to the input circuit of the transformer for purposes of supplying output voltage information to the control block. For purpose of isolating the input circuit and the output circuit of the transformer, the feedback loop of the conventional flyback converter usually employs an optical-coupler to supply the feedback information of the output voltage to the control block. Thus the control block can adjust the output voltage by controlling the power supply to the transformer according to the feedback information.

Controlling the power supply with precision is essential for effective power transfer in flyback converters. Because the input voltage is unstable and the winding ratio of the secondary winding to the primary winding is usually constant, the output voltage at the secondary winding will be unstable responsive to the input voltage. The stability of the output voltage ripple is not sufficiently ideal even though extra circuits such as filters may be employed to improve the performance of the converter. In addition, the load transient response in conventional converters is slow as the optical-coupler is coupled to the transformer to induce the feedback information of the output voltage to the control block of the transformer while isolating the input circuit and the output circuit of the transformer. As such, conventional converter topologies and methodologies perform unsatisfactorily.

SUMMARY OF THE INVENTION

A flyback DC-DC converter can convert a DC input voltage to a DC output voltage. The flyback converter includes a controller and a transformer. The transformer includes a primary winding, a first secondary winding and a second secondary winding. The transformer receives the DC input voltage by the primary winding and generates the DC output voltage at the first secondary winding. The second secondary winding constructs a feedback loop. The feedback loop supplies a feedback voltage via the second secondary winding to the controller. Thus, the controller can control power supply of the DC input voltage according to the feedback voltage.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
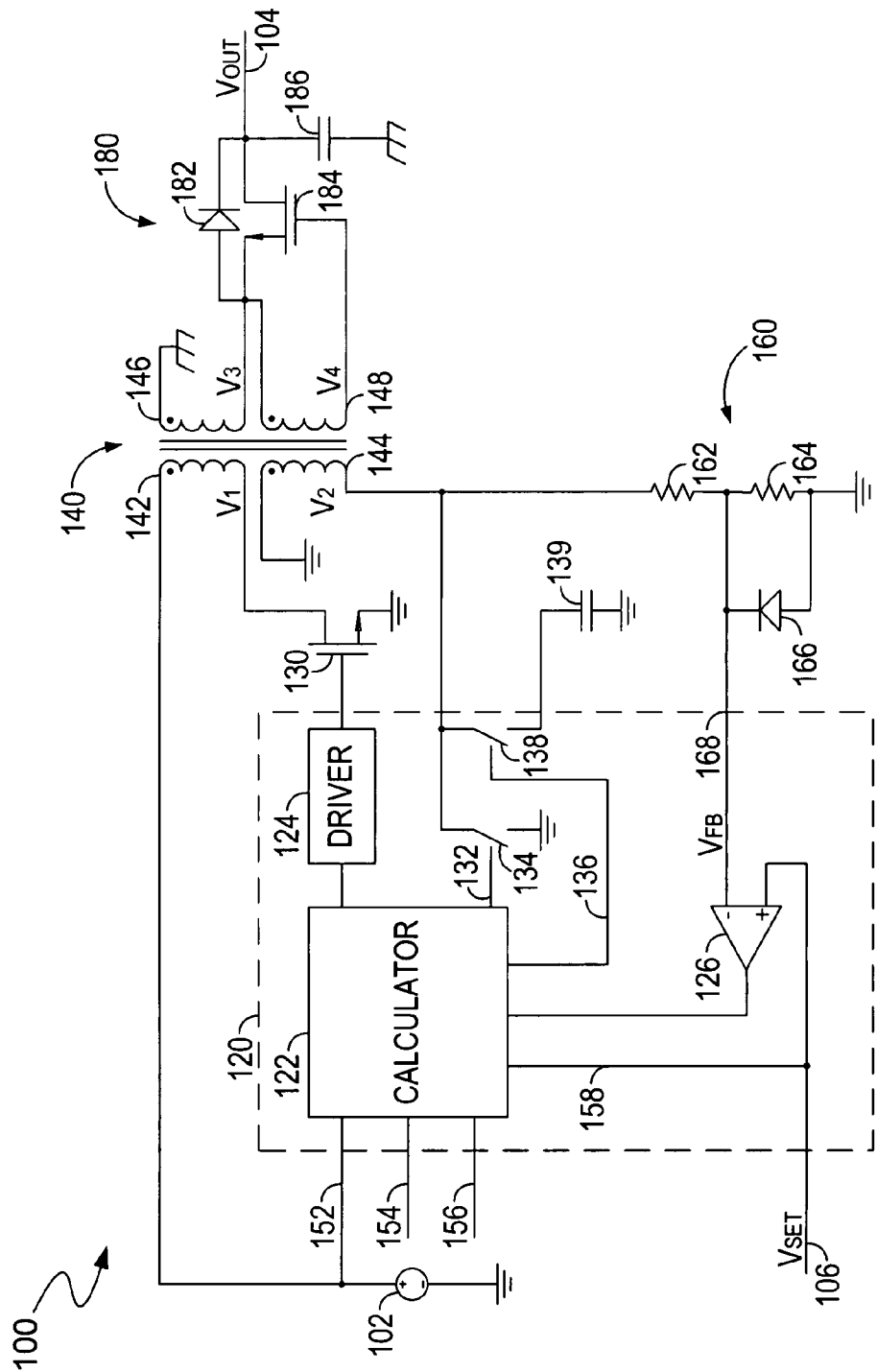
FIG. 1 is a simplified schematic diagram of a flyback DC-DC converter, according to one embodiment of the present invention.

The present invention provides a flyback converter, preferably a flyback DC-DC converter to generate a DC output voltage with a constant ripple current (CRC) based on a DC input voltage. Since the embodiments shown in the drawings are only for illustrative purpose, some sub-components and/or peripheral components generally incorporated in the invention are omitted herein. In describing the preferred embodiments, specific terminologies are employed for the sake of clarity. However, the disclosure of this patent specification is not intended to be limited to the selected terminologies and the specified embodiments. It is understood by those skilled in the art that each specific element includes all technical equivalents that operate in a similar manner.

FIG. 1 illustrates a schematic diagram of an exemplary embodiment of a flyback converter 100 that converts a DC input voltage from a power source 102 to a DC output voltage Vout. The flyback converter 100 includes a controller 120, an input switching circuit 130, a transformer 140, an output switching circuit 180 and a voltage divider 160. The transformer 140 receives the DC input voltage from the power source 102 and generates the output voltage Vout at an output terminal 104. The controller 120 is connected between the power source 102 and the input switching circuit 130 to control the power supply from the power source 102 to the transformer 140 by controlling states of the input switching circuit 130. Because the input switching circuit 130 is coupled to the transformer 140 in series, the power supply from the power source 102 to the transformer 140 is cut off when the input switching circuit 130 is in an OFF state and the power is supplied to the transformer 140 when the input switching circuit 130 is in an ON state. Hence, the transformer 140 receives the input voltage from the power source 102 and converts the input voltage to the output voltage Vout or stores energy from the power source 102 in flux of the transformer 140.

The controller 120 includes a comparator 126, a calculator 122 and a driver 124. The controller 120 can operate in a continuous current mode (CCM) or a discontinuous current mode (DCM), which is controlled by a signal 156. When the signal 156 is set to low, the controller 120 operates in the CCM. When the signal 156 is set to high, the controller 120 operates in the DCM. The flyback converter 100 can include a first switch 134, a second switch 138, and a capacitor 139 coupled to the second switch 138. The first switch 134 and the second switch 138 are controlled by a signal 132 and a signal 136 respectively.

In the CCM, the calculator 122 can receive a pulse signal from the comparator 126 and an input voltage $V_{IN}$ 152 from the power source 102. When the pulse signal is at a high level, the calculator 122 can calculate an on-time interval $T_{ON}$ according to $V_{IN}$ 152. Moreover, the calculator 122 can generate a pulse width modulation (PWM) signal according to $T_{ON}$. Subsequently, the driver 124 controls the states of the input switching circuit 130 based on the PWM signal. Referring to the generation of the PWM signal, the calculator 122 calculates the on-time interval $T_{ON}$ based on the transient input voltage $V_{IN}$ from the power source 102 with an equation (1).

$$T_{ON}=K/V_{IN} \quad (1)$$

Referring to the equation (1), the parameter K is a preset constant. The PWM signal is set to logic 1 during a time period of $T_{ON}$ and to logic 0 after the time period of $T_{ON}$. The calculator 122 periodically calculates $T_{ON}$ to generate a continuous PWM signal according to high level of the pulse signal from the comparator 126. The PWM signal then is provided to the driver 124 and the driver 124 controls the states of the input switching circuit 130 according to the PWM signal. The input switching circuit 130 is switched on when the PWM signal is set to logic 1 and switched off when the PWM signal is set to logic 0. The controller 120 regulates the output voltage of the flyback converter 100 by modulating the PWM signal in response to the transient input voltage $V_{IN}$.

In the DCM, the calculator 122 can calculate an on-time interval $T_{ON}$, an off-time interval $T_{OFF}$ after $T_{ON}$, and a skip-time interval $T_{SKIP}$ after $T_{OFF}$. The PWM signal is set to low during $T_{OFF}$ and $T_{SKIP}$. The controller 120 can receive an input signal 154 and a preset reference voltage $V_{SET}$ 106. $T_{OFF}$ is calculated according to $T_{OFF}=K/(m*V_{SET})$. In this equation, K is the preset constant in equation (1) and m is a value of the input signal 154. $T_{SKIP}$ can be a preset value.

The transformer 140 is coupled to the power source 102 via a primary winding 142 to receive the input voltage $V_{IN}$ from the power source 102. The input switching circuit 130 is coupled between the winding 142 of the transformer 140 and ground. Hence, the input switching circuit 130 is capable of cutting off the power supply from the power source 102 to the transformer 140. The input switching circuit 130 may be a metal-oxide-semiconductor field-effect transistor (MOSFET). The driver 124 inside the controller 120 is connected to a gate terminal of the transistor 130 to control the states of the transistor 130. When the transistor 130 is turned on, a current flows from the power source 102 through the winding 142 and the transistor 130 to ground. When the transistor 130 is turned off, the current flowing through the winding 142 is cut off so that no power is transferred to the transformer 140.

The transformer 140 includes secondary windings 146 and 148. With the power supplied to the winding 142, the transformer 140 generates voltages $V_3$ and $V_4$ at the secondary windings 146 and 148. The winding 146 is coupled to the output terminal 104 of the flyback converter 100 via an output switching circuit 180, to which is coupled the winding 148 to control the states of the output switching circuit 180. The output switching circuit 180 may be composed of a metal-oxide-semiconductor field-effect transistor (MOSFET) 184 and a diode 182, preferably a Schottky diode. The diode 182 may be a diode integrated within the transistor 184. The winding 148 is coupled to a gate terminal of the transistor 184 to control the states of the transistor 184.

When the voltage $V_4$ at the winding 148 is lower than a threshold voltage of the transistor 184, the transistor 184 is set to an OFF state and the voltage $V_3$ at the winding 146 is conducted to the output terminal 104 of the flyback converter 100 through the diode 182 if the voltage $V_3$ at the winding 146 is higher than a forward voltage drop of the diode 182. When the voltage $V_4$ at the winding 148, which is identified as a gate-source voltage $V_{GS}$ of the transistor 184, reaches to the threshold voltage of the transistor 184, the transistor 184 is turned on and the voltage $V_3$ at the winding 146 is transmitted to the output terminal 104 through the transistor 184. As power consumption of a transistor is much less than that of a diode in a similar condition, the construction of the diode 182 and the transistor 184 reduces the power consumption on the output switching circuit 180. Thus, the power transfer efficiency of the flyback converter 100 is greatly increased. Further, a capacitor 186 is coupled between the output terminal 104 and the chassis to avoid voltage jump of the output voltage $V_{OUT}$ if the voltage $V_3$ at the winding 146 is changed dramatically at a transient moment.

In a conventional flyback converter, a feedback voltage is usually induced from the output circuit to the input circuit of the transformer by an optical-coupler or other similar apparatus that can isolate the input and output circuits of the transformer. For a converter employing an optical-coupler in a feedback loop to conduct information from the output circuit to the input circuit of the transformer, the optical-coupler employs light to transmit information across an isolation barrier. Typically, a light emitting diode (LED) transmits information to a light sensitive receiver (e.g., a transistor). However, the optical-coupler has many drawbacks, such as low transient response, extra compensation circuit needed, high power consumption, etc. As system load condition at the output terminal of the transformer is variable, the feedback voltage can't reflect an accurate change of the transient output voltage of the transformer. Consequently, it is difficult to adjust the output voltage value precisely according to the feedback voltage referring to the low load-transient response of the optical-coupler. Methods such as employing extra compensation circuit have been developed to improve drawbacks of the optical-coupler. However, extra circuits do not give a perfect performance while the converter components, size, cost and especially power consumption increase.

In the present invention, the flyback converter 100 is equipped with a secondary winding 144 in a feedback loop. The voltage divider 160 is connected to the winding 144 to generate a feedback voltage $V_{FB}$ 168 indicative of the output voltage 104 of the transformer 140. The voltage divider 160 may consist of resistors 162 and 164 coupled in series. In some embodiments, other arrangements of components can be employed to construct a voltage divider having a similar function. It should be appreciated that, the transformer 140 generates a voltage $V_2$ at the winding 144 and supplies the voltage $V_2$ to the voltage divider 160. The voltage divider 160 generates the feedback voltage $V_{FB}$ 168 that is a scaled down voltage based on the voltage $V_2$ at the winding 144 of the transformer 140. The feedback voltage $V_{FB}$ 168 can reflect an accurate value of the output voltage $V_{OUT}$ according to the winding ratio of the winding 144 to the winding 146.

The winding 144 is coupled between the ground and the voltage divider 160. The transformer 140 transfers power from the power source 102 to the windings 144, 146 and 148 according to winding ratios respectively. The voltage $V_2$ at the winding 144 is proportional to the voltage $V_3$ at the winding 146, while the voltage $V_3$ at the winding 146 affects the value of the output voltage $V_{OUT}$ at the output terminal 104. The feedback voltage $V_{FB}$ 168 is scaled down from the voltage $V_2$ at the winding 144 by the voltage divider 160. Hence, the feedback voltage $V_{FB}$ 168 is also proportional to the voltage $V_3$ at the winding 146. Therefore, the feedback voltage $V_{FB}$ 168 can reflect the transient value of the output voltage $V_{OUT}$ at the output terminal 104 accurately. This feedback topology has a simple construction compared with conventional topologies. The input circuit is isolated from the output circuit of the transformer 140 without an optical-coupler, while compensation circuits are saved and load transient response accuracy is improved.

The comparator 126 is coupled between the voltage divider 160 and the calculator 122. The comparator 126 compares the feedback voltage $V_{FB}$ 168 from the voltage divider 160 with the reference voltage $V_{SET}$ 106. The value of $V_{SET}$ 106 is set at a proper value and can be adjusted according to users' requirements. If the feedback voltage $V_{FB}$ 168 is lower than the voltage $V_{SET}$ 106, which situation may happen during the PWM signal is set to logic 0, the comparator 126 generates a pulse signal at high level to the calculator 122 to calculate an on-time interval $T_{ON}$ based upon equation (1). In this situation, the PWM signal is set to logic 1 again. Consequently, the transistor 130 is turned on and power is supplied to the transformer 140 from the power source 102 again.

Further, a diode 166 is connected between a negative input terminal of the comparator 126 and the ground. An anode of the diode 166 is connected to the ground and a cathode of the diode 166 is connected to the junction of the transistors 162 and 164. Thus the feedback voltage $V_{FB}$ 168 from the voltage divider 160 is ensured to be in a voltage range of –X~Y, wherein the parameter X is a forward voltage drop of the diode 166 and the parameter Y is a reverse breakdown voltage of the diode 166. If the feedback voltage $V_{FB}$ 168 is lower than the inverse value of the forward voltage drop X, the diode 166 is switched on to protect the comparator 126. If the feedback voltage $V_{FB}$ 168 is higher than the reverse breakdown voltage of the diode 166, the diode 166 will be broken down reversely also to protect the comparator 126.

When the signal 156 is set to low, the controller 120 operates in the continuous current mode (CCM). In the CCM, the first switch 134 is turned off by the signal 132. The second switch 138 is turned off during $T_{ON}$, and is turned on after $T_{ON}$ by the signal 136. The calculator 122 continuously calculates $T_{ON}$ to generate the continuous PWM signal to the driver 124. The power source 102 supplies power to the transformer 140 when the PWM signal is at high. If the power from the power source 102 is stopped being provided to the transformer 140 when the PWM signal is at low, the output voltage $V_{OUT}$ 104 and the feedback voltage $V_{FB}$ 168 decrease. If the feedback voltage $V_{FB}$ 168 is lower than the reference voltage $V_{SET}$ 106, the calculator 122 calculates another $T_{ON}$. Thus, the power source 102 supplies power to the transformer 140 repeatedly according to the PWM signal. In the CCM, the winding 146 has a continuous current $I_3$ when the PWM signal is at low.

When the signal 156 is set to high, the controller 120 operates in the discontinuous current mode (DCM). A reverse current from the capacitor 186 to the winding 146 may exist if a load current is small. The reverse current can be avoided if the flyback converter is operating in the DCM. Therefore, the system efficiency can be improved.

In the DCM, the calculator 122 also calculates a $T_{ON}$ according to $T_{ON}=K/V_{IN}$ and sets the PWM signal at high during $T_{ON}$. Simultaneously, the first switch 134 is turned off by the signal 132 and the second switch 138 is turned off by the signal 136. The power source 102 supplies power to the transformer 140. When the PWM signal goes to low after $T_{ON}$, the second switch 138 is turned on. Simultaneously, the calculator 122 calculates a $T_{OFF}$ according to $T_{OFF}=K/(m*V_{SET})$. Because the load current is small, the current I3 at the winding 146 charges the capacitor 186. Therefore, the output voltage $V_{OUT}$ increases during $T_{OFF}$. Also, the feedback voltage $V_{FB}$ 168 may be higher than the reference voltage $V_{SET}$ 104 at the end of $T_{OFF}$.

A skip operation is triggered if $V_{FB}$ 168 is higher than $V_{SET}$ 106 at the end of $T_{OFF}$. The calculator 122 calculates a $T_{SKIP}$. $T_{SKIP}$ can be a preset value according to application requirement. The first switch 134 is turned on and the second switch 138 is turned off during $T_{SKIP}$. Consequently, the voltage $V_2$ at the winding 144 and the feedback voltage $V_{FB}$ 168 are zero because the first switch 134 is connected to ground. Thus, the voltage $V_4$ at the winding 148 is zero, which switches off the transistor 184. Reverse current from the capacitor 186 to the winding 146 via the transistor 184 can be avoided. The capacitor 186 provides the output voltage $V_{OUT}$ during $T_{SKIP}$. Thus, the current $I_3$ through the winding 146 is zero, which indicates a discontinuous current in DCM.

After $T_{SKIP}$, a negative detect pulse is generated. The first switch 134 is turned off and the second switch 138 is turned on. The voltage $V_2$ at the winding 144 copies the positive voltage on the capacitor 139. Thus, the voltage $V_4$ at the winding 148 changes to positive and turns on the transistor 184. It is appreciated that the voltage $V_3$ at the winding 146 provides the output voltage $V_{OUT}$ because the winding 146 is connected to the output terminal 104 via the transistor 184. Therefore, the feedback voltage $V_{FB}$ 168 can reflect the value of $V_{OUT}$ according to the voltage divider 160. If $V_{FB}$ 168 is higher than $V_{SET}$ 104, another skip operation will be triggered until $V_{FB}$ 168 is detected to be smaller than $V_{SET}$ 104 after next $T_{SKIP}$. Then, $T_{ON}$ is calculated to set the PWM signal to high and the flyback converter 100 operates repeatedly.

Figure 2:
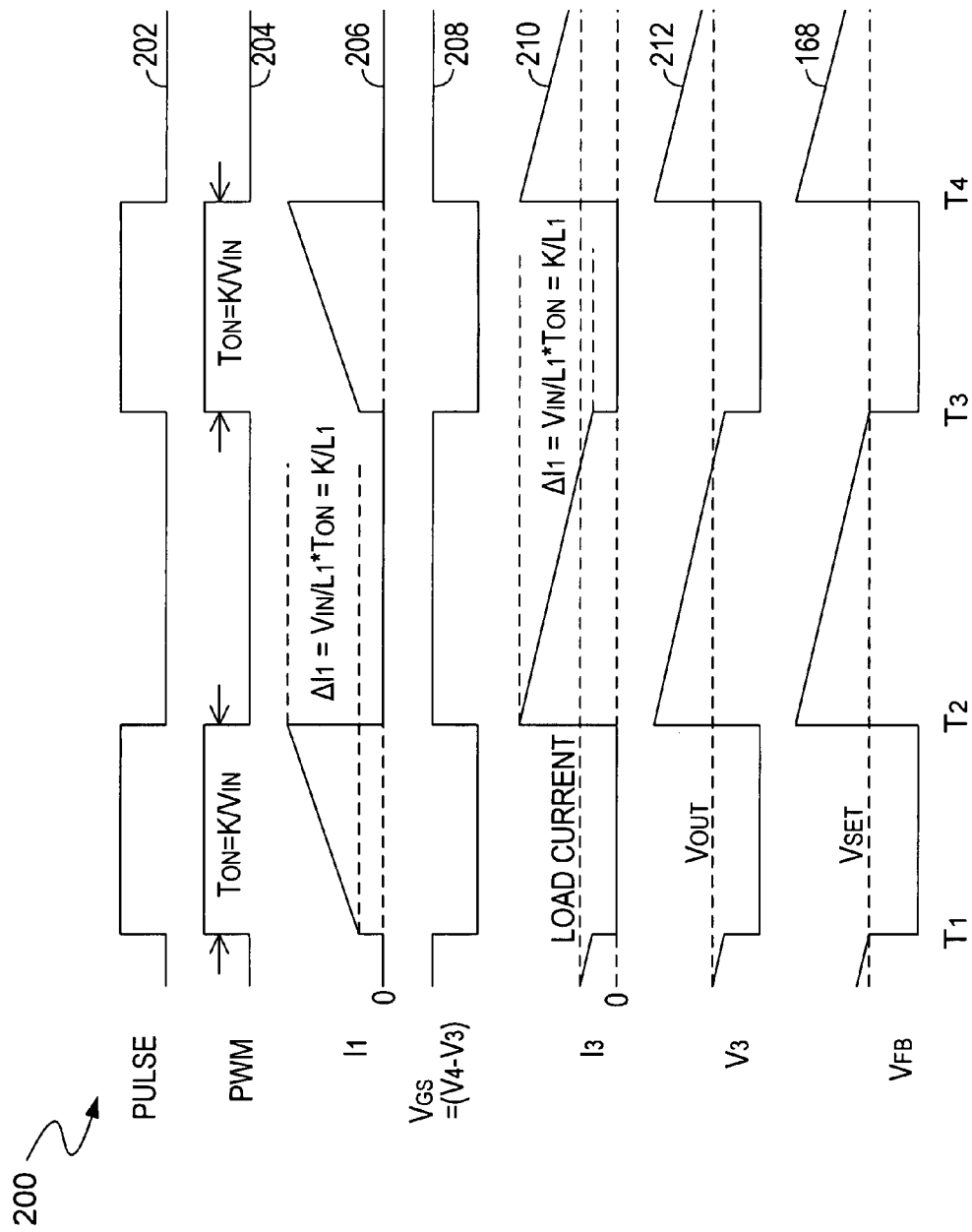
FIG. 2 illustrates waveforms during operation in a continuous current mode (CCM) of a flyback DC-DC converter according to one embodiment of the present invention.

FIG. 2 illustrates waveforms 200 of signals present at various locations of the flyback converter 100 in FIG. 1 when it operates in a CCM according to one embodiment of the invention. The waveforms 200 represent a pulse signal 202 from the comparator 126 to the calculator 122, a PWM signal 204 generated by the calculator 122, a current $I_1$ 206 flowing through the winding 142, a voltage $V_{GS}$ 208 of the gate-source voltage of the transistor 184, a current $I_3$ 210 flowing through the winding 146 of the transformer 140, a voltage $V_3$ 212 at the winding 146 and the feedback voltage $V_{FB}$ 168. The waveforms 200 show the periodical operation of the flyback converter 100 in FIG. 1.

At a moment $T_1$ where the feedback voltage $V_{FB}$ 168 decreases to the value of the voltage $V_{SET}$ 106, the comparator 126 sets the pulse signal 202 to logic 1. The calculator 122 is driven to calculate a $T_{ON}$ time interval at the rising edge of the pulse signal 202 and the PWM signal 204 is set to logic 1 for a time interval equal to $T_{ON}$. Simultaneously, the transistor 130 is switched on by the driver 124 corresponding to the PWM signal 204 at logic 1. Therefore, the current $I_1$ 206 flows from the power source 102 to the ground via the winding 142 and the transistor 130. The current $I_1$ 206 increases gradually while power is transferred to the transformer 140 continuously. During the time period $T_{ON}$, the voltage $V_3$ 212 of the winding 146 is negative. A voltage $V_4$ of the winding 148 is lower than the voltage $V_3$ of the winding 146. Hence, the gate-source voltage $V_{GS}$ 208 of the transistor 184 is negative. The diode 182 and the transistor 184 are switched off. Since no current flows through the winding 146 via the output switching circuit 180 to the output terminal 104, the current $I_3$ 210 through the winding 146 is zero. The feedback voltage $V_{FB}$ 168 drops to negative at the time point $T_1$ corresponding to the negative voltage $V_2$ of the winding 144.

At a moment $T_2$, the PWM signal 204 is set to logic 0 responsive to the end of the time period $T_{ON}$ since $T_1$. The transistor 130 is switched off by the driver 124 thus the current $I_1$ through the winding 142 is zero. The voltage $V_1$ at a drain terminal of the transistor 130 jumps to a value higher than the input voltage $V_{IN}$. Thus the voltages $V_2$ at the winding 144 and $V_3$ 212 at the winding 146 become positive. Furthermore, the voltage $V_4$ at the winding 148 is higher than the voltage $V_3$ 212 so that the gate-source voltage $V_{GS}$ 208 exceeds the threshold voltage of the transistor 184 and the transistor 184 is switched on. Since the output voltage $V_{OUT}$ at the output terminal 104 is maintained at a certain value by the capacitor 186, the voltage $V_3$ 212 is higher than the voltage $V_{OUT}$. In this situation, a current $I_3$ 210 will flow from the ground to the output terminal 104 via the winding 146 and the transistor 184. Simultaneously, the feedback voltage $V_{FB}$ 168 jumps to a peak value at the moment $T_2$ corresponding to the voltage increase of the voltage $V_1$.

During this time period from $T_2$, power supply from the power source 102 to the transformer 140 is cut off since the transistor 130 is at an OFF state. The power stored in the flux of the transformer 140 is transferred to the windings 144, 146 and 148. As the stored power reduces, the voltages $V_2$, $V_3$ 212 and $V_4$ will decrease gradually. Consequently, the current $I_3$ 210 and the feedback voltage $V_{FB}$ 168 also decrease gradually from the moment $T_2$. As soon as the feedback voltage $V_{FB}$ 168 falls down to the value of the voltage $V_{SET}$ at a moment $T_3$, the comparator 126 generates a pulse signal again to the calculator 122. Another $T_{ON}$ is calculated and power is conducted to the transformer 140 from the power source 102. Thus, another cycle of power transfer begins at the moment $T_3$. In this way, the flyback converter 100 repeatedly operates in a mode similar to the previously described working process from $T_1$ to $T_2$, then $T_3$, and continuously generates the output voltage $V_{OUT}$.

The current $I_1$ 206 illustrates the change of the current flowing through the primary winding 142. During the time period from $T_1$ to $T_2$, the current $I_1$ 206 increases gradually to a peak because the transistor 130 is at an ON state. The magnitude of the current $I_1$ is recognized as current ripple, earmarked as $\Delta I_1$. The value of the current ripple $\Delta I_1$ is measured by an equation (2).

$$\Delta I_1 = V_{IN}/L_1 * T_{ON} = K/L_1 \qquad (2)$$

In the equation (2), $V_{IN}$ is the input voltage value, the parameter K is the preset constant in the equation (1) and $L_1$ is the inductance of the winding 142. Because both the parameter K and the inductance $L_1$ are constant, the current ripple $\Delta I_1$ is constant. Similarly, the current $I_3$ also has a constant current ripple $\Delta I_3$. Consequently, comparing with prior art, the present flyback converter 100 has a constant current ripple that illustrates a stable output voltage of the converter 100.

Figure 3:
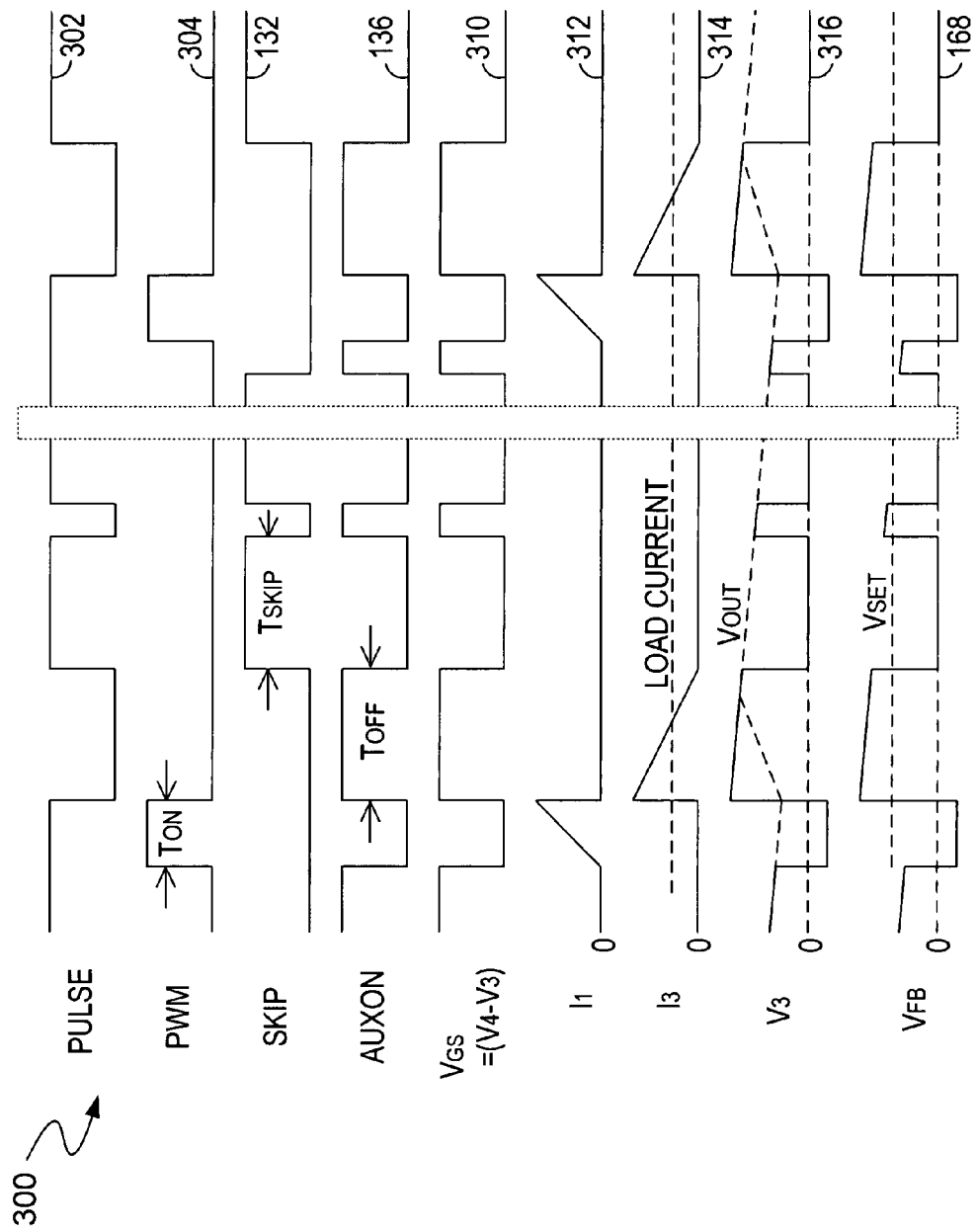
FIG. 3 illustrates waveforms during operation in a discontinuous current mode (DCM) of a flyback DC-DC converter according to one embodiment of the present invention.

FIG. 3 illustrates waveforms 300 of signals present at various locations in the flyback converter 100 of FIG. 1 when it is operating in the DCM according to one embodiment of the invention. The waveforms 300 represent a pulse signal 302 from the comparator 126 to the calculator 122, a PWM signal 304 generated by the calculator 122, the signal 132, the signal 136, a voltage $V_{GS}$ 310 of the gate-source voltage of the transistor 184, a current $I_1$ 312 flowing through the winding 142, a current $I_3$ 314 flowing through the winding 146 of the transformer 140, a voltage $V_3$ 316 at the winding 146 and the feedback voltage $V_{FB}$ 168. FIG. 3 will be discussed briefly to avoid repetition of discussions made with reference to FIG. 2.

During $T_{ON}$ of the PWM signal 304, the power source 102 supplies power to the transformer 140. During $T_{OFF}$ after $T_{ON}$, $I_3$ 314 supplies power to the load and the capacitor 186. Thus, $I_3$ 314, $V_3$ 316 and $V_{FB}$ 168 decreases, and $V_{OUT}$ increases. The skip operation is triggered if $V_{FB}$ 168 is higher than $V_{SET}$ at the end of $T_{OFF}$. $I_3$ 314 is zero and $V_{OUT}$ drops during $T_{SKIP}$. If $V_{FB}$ 168 is detected to be higher than $V_{SET}$ after $T_{SKIP}$, another skip operation will be triggered. If $V_{FB}$ 168 is detected to be lower than $V_{SET}$ after $T_{SKIP}$, the PWM signal 304 is set to high according to another $T_{ON}$. Thus, the flyback converter 100 operates repeatedly.

In operation, when the flyback converter 100 is powered on, the power source 102 supplies an input DC voltage to the primary winding 142 of the transformer 140 as well as the calculator 122. A start-up circuit (not shown in the figures) may be employed to activate the flyback converter 100 to work. The start-up circuit drives the calculator 122 to calculate a $T_{ON}$ time with the equation (1) mentioned above and outputs a PWM signal at logic 1 to the driver 124. Thus, the driver 124 turns on the transistor 130 for a period of time $T_{ON}$ when the PWM signal is set to logic 1. Hence, a current flows from the power source 102 to the ground via the primary winding 142 and the transistor 130. The transformer 140 receives energy from the power source 102 and stores the energy in the flux of the transformer 140 during the time period of $T_{ON}$.

After the time period of $T_{ON}$, the transistor 130 is switched off by the driver 124. Thus, power source 102 terminates the power supply to the transformer 140. The transformer 140 begins to generate voltages at the secondary windings 144, 146 and 148 with the energy stored in the flux of the transformer 140. The voltages at the secondary windings 144, 146 and 148 jump to a peak value at the moment when the transistor 130 is switched off. If a load is connected to the output terminal 104 of the flyback converter 100, the voltage $V_3$ at the secondary winding 146 is supplied to the load via the output switching circuit 180. Since the energy stored in the flux of the transformer 140 reduces gradually, the voltages $V_2$, $V_3$, $V_4$ and $V_{FB}$ decrease gradually when the input switching circuit 130 is set to an OFF state.

When the transistor 184 is switched on if the voltage gate-source voltage $V_{GS}$ of the transistor 184 is higher than the threshold voltage of the transistor 184, the voltage $V_3$ at the winding 146 is supplied to the output terminal 104 through the transistor 184. If the voltage gate-source voltage $V_{GS}$ is lower than the threshold voltage of the transistor 184, the voltage $V_3$ at the winding 146 is supplied to the output terminal 104 through the diode 182 if the voltage $V_3$ is higher than the forward voltage drop of the diode 182. However, the output voltage $V_{OUT}$ is maintained at a certain value by the capacitor 186. Since the resistance of the transistor 184 is much less than the resistance of the diode 182, the power consumption of the output switching circuit 180 is much less if the voltage $V_3$ is transferred to the output terminal 104 through the transistor 184 rather than through the diode 182. After $T_{ON}$, the feedback voltage $V_{FB}$ 168 from the voltage divider 160 also decreases in response to the decrease of the voltage $V_2$ at the secondary winding 144.

If the flyback converter 100 operates in the CCM, when the feedback voltage $V_{FB}$ 168 is smaller than the preset voltage Vset 106, the comparator 126 outputs a pulse signal at logic 1 level to the calculator 122. Receiving the pulse signal from the comparator 126, the calculator 122 is driven to calculate a time period $T_{ON}$. Again, the PWM signal is set to logic 1 during another time period $T_{ON}$. The transistor 130 is turned on driven by the driver 124 to allow the current flowing from the power source 102 through the primary winding 142 of the transformer 140 to the ground. As soon as the transistor 130 is turned on, the voltage $V_1$ at the primary winding 142 drops to zero and the voltages $V_2$, $V_3$ and $V_4$ at the secondary windings 144, 146 and 148 turn to negative. In this manner, power from the power source 102 is transferred to and stored in the transformer 140. Then the power stored in the transformer 140 will be transferred to the secondary windings 146, 144 and 148 after the time period $T_{ON}$. Briefly, the PWM signal turns to logic 0 after a time period of $T_{ON}$. The feedback voltage $V_{FB}$ 168 will activate the calculator 122 to recalculate a $T_{ON}$ and reset the PWM signal to logic 1 at a proper time. With this periodical operation, the flyback converter 100 generates a continuous output voltage $V_{OUT}$ at a desired value. The switching frequency of the input switching circuit 130 controlled by the PWM signal is changeable according to the transient value of the input voltage value.

If the flyback converter 100 operates in the DCM, the calculator 122 calculates a $T_{OFF}$ after $T_{ON}$. If the feedback voltage $V_{FB}$ 168 is higher than $V_{SET}$ 106 at the end of $T_{OFF}$, the skip operation is triggered for a period of $T_{SKIP}$. During $T_{SKIP}$, the transistor 184 is turned off to avoid reverse current from the capacitor 186 to the winding 146. After $T_{SKIP}$, the transistor 184 is turned on to obtain an immediate $V_{FB}$ 168. If $V_{FB}$ 168 is still higher than $V_{SET}$ 106, another skip operation is triggered for another period of $T_{SKIP}$. If $V_{FB}$ 168 is smaller than $V_{SET}$ 106, $T_{ON}$ is calculated and the PWM signal is set to high. Therefore, the flyback converter 100 is operating repeatedly.

Compared with some conventional flyback converters, the present invention employs the secondary winding 144 to implement a feedback function and a controller 120 to regulate the output voltage value. This topology improves the performance of the flyback converter, such as the improved load-transient response, a constant ripple current and a stable output voltage while the necessity for compensation circuits and other external optical-coupling devices in conventional solutions is avoided. Consequently, the performance and efficiency of the present converter as compared to conventional converters is improved while the complexity and the cost thereof are greatly reduced.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A flyback DC-DC converter for converting a DC input voltage to a DC output voltage, comprising:
    a transformer for receiving the DC input voltage, converting the DC input voltage to the DC output voltage, and generating a feedback voltage, wherein the transformer comprises:
        a first secondary winding for generating the DC output voltage;
        a second secondary winding for providing a voltage indicative of the DC output voltage; and
        a third secondary winding coupled to the first secondary winding and for controlling a transfer of the DC output voltage;
    an output transistor, wherein the first secondary winding is coupled between a source terminal of the output transistor and ground and wherein the third secondary winding is coupled between the source terminal and a gate terminal of the output transistor;
    an input switching circuit coupled to the transformer;
    an analog controller coupled to the input switching circuit and operable for triggering a skip operation if the feedback voltage is higher than a preset reference voltage at the end of a turn-off period of the input switching circuit and also for regulating the DC output voltage according to the DC input voltage and the feedback voltage; and
    a first switch coupled to the second secondary winding, and controlled by the analog controller, wherein the first switch is switched on during the skip operation, and switched off during the turn-off period.

2. The flyback DC-DC converter of claim 1, wherein the transformer comprises:
    a primary winding for receiving the DC input voltage.

3. The flyback DC-DC converter of claim 1, further comprising a voltage divider coupled to the second secondary winding of the transformer, wherein the voltage divider scales down the voltage at the second secondary winding and generates the feedback voltage.

4. The flyback DC-DC converter of claim 1, wherein the input switching circuit is coupled to the analog controller and a primary winding of the transformer, and wherein the analog controller controls a state of the input switching circuit.

5. The flyback DC-DC converter of claim 4, wherein the analog controller comprises:
    a comparator for comparing the feedback voltage with a preset value and generating a signal based on a comparison result of the feedback voltage and the preset value;
    a calculator for generating a PWM signal in response to the signal from the comparator and the DC input voltage; and
    a driver for receiving the PWM signal from the calculator, wherein the driver controls the state of the input switching circuit according to the PWM signal.

6. The flyback DC-DC converter of claim 5, further comprising:
    a second switch coupled to the second secondary winding, wherein the second switch is controlled by the calculator.

7. The flyback DC-DC converter of claim 6, further comprising:
    a capacitor coupled between the second switch and ground.

8. The flyback DC-DC converter of claim 5, wherein the input switching circuit is switched on when the PWM signal is set to logic 1.

9. The flyback DC-DC converter of claim 5, wherein the input switching circuit is switched off when the PWM signal is set to logic 0.

10. The flyback DC-DC converter of claim 1, further comprising:

an output switching circuit coupled to the first secondary winding and the third secondary winding, wherein the output switching circuit comprises a diode and a third switch coupled in parallel, wherein the third secondary winding controls a state of the output switching circuit, and wherein the third switch comprises the output transistor.

11. The flyback DC-DC converter of claim 1, wherein a turn-on time ($T_{ON}$) of the input switching circuit is calculated by $$T_{ON}=K/V_{IN}$$

wherein K is a preset constant and $V_{IN}$ is the DC input voltage.

12. The flyback DC-DC converter of claim 1, wherein the turn-off time ($T_{OFF}$) of the input switching circuit is calculated by $$T_{OFF}=K/(m*V_{SET})$$

wherein K is a preset constant, m is an input signal, and $V_{SET}$ is the preset reference voltage.

13. The flyback DC-DC converter of claim 1, wherein the analog controller has a continuous current mode and a discontinuous current mode, and wherein the analog controller is operable for triggering the skip operation in the discontinuous current mode.

14. A flyback DC-DC converter for converting a DC input voltage to a DC output voltage, comprising:
an analog controller that regulates the DC output voltage according to a transient value of the DC input voltage;
a transformer that receives the DC input voltage and converts the DC input voltage to the DC output voltage, wherein the transformer comprises:
a primary winding for receiving the DC input voltage;
a first secondary winding for generating the DC output voltage;
a second secondary winding that is a part of a feedback loop, the feedback loop supplying a feedback voltage indicative of the DC output voltage via the second secondary winding to the analog controller; and
a third secondary winding coupled to the first secondary winding and for controlling a transfer of the DC output voltage;
an output switching circuit coupled to the transformer and for outputting the DC output voltage, wherein the output switching circuit comprises an output transistor, wherein the first secondary winding is coupled between a source terminal of the output transistor and ground, and wherein the third secondary winding is coupled between the source terminal and a gate terminal of the output transistor,
an input switching circuit coupled to the transformer, wherein the analog controller is coupled to the input switching circuit, triggers a skip operation if the feedback voltage is higher than a preset reference voltage at the end of a turn-off period of the input switching circuit, and regulates the power supply to the transformer according to the feedback voltage, and
a first switch coupled to the second secondary winding, and controlled by the analog controller, wherein the first switch is switched on during the skip operation, and switched off during the turn-off period.

15. The flyback DC-DC converter of claim 14, further comprising:
a voltage divider that is a part of the feedback loop, wherein the voltage divider is coupled to the second secondary winding to scale down a voltage at the second secondary winding and generate the feedback voltage.

16. The flyback DC-DC converter of claim 14, wherein the input switching circuit is coupled to the primary winding and the analog controller, and wherein the analog controller controls a state of the input switching circuit.

17. The flyback DC-DC converter of claim 16, wherein the analog controller comprises:
a comparator for comparing the feedback voltage with a preset value and generating a signal based on a comparison result between the feedback voltage and the preset value;
a calculator for generating a PWM signal based on the signal from the comparator and the DC input voltage; and
a driver for receiving the PWM signal from the calculator, wherein the driver controls the state of the input switching circuit according to the PWM signal.

18. The flyback DC-DC converter of claim 17, wherein the input switching circuit is switched on when the PWM signal is set to logic 1.

19. The flyback DC-DC converter of claim 17, wherein the input switching circuit is switched on when the PWM signal is set to logic 0.

20. The flyback DC-DC converter of claim 14, wherein the output switching circuit is coupled to the first secondary winding and the third secondary winding, wherein the output switching circuit comprises a diode and a switch coupled in parallel, wherein the third secondary winding controls a state of the output switching circuit, and wherein the switch comprises the output transistor.

21. The flyback DC-DC converter of claim 14, further comprising:
a second switch coupled to the second secondary winding, wherein the second switch is controlled by the calculator.

22. The flyback DC-DC converter of claim 21, further comprising:
a capacitor coupled between the second switch and ground.

23. The flyback DC-DC converter of claim 14, wherein a turn-on time ($T_{ON}$) of the input switching circuit is calculated by $$T_{ON}=K/V_{IN}$$

wherein K is a preset constant and $V_{IN}$ is the DC input voltage.

24. The flyback DC-DC converter of claim 14, wherein the turn-off time ($T_{OFF}$) of the input switching circuit is calculated by $$T_{OFF}=K/(m*V_{SET})$$

wherein K is a preset constant, m is an input signal, and $V_{SET}$ is the preset reference voltage.

* * * * *